June 14, 1932.  J. S. McDONNELL, JR  1,862,902
AIRPLANE
Filed Aug. 23, 1930   6 Sheets-Sheet 6
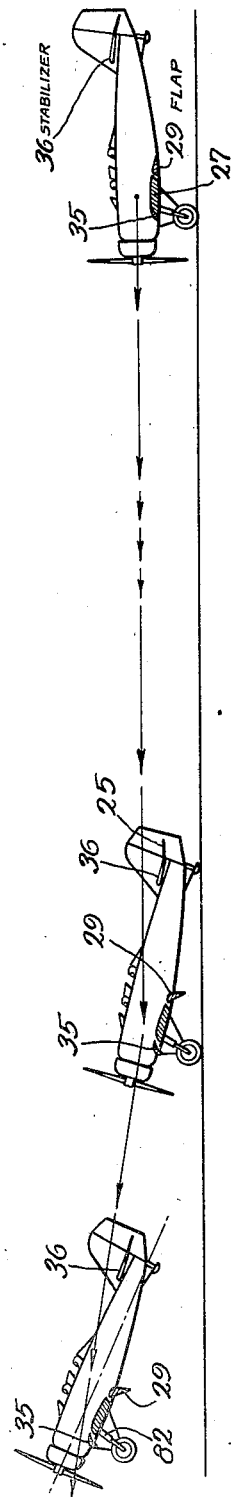
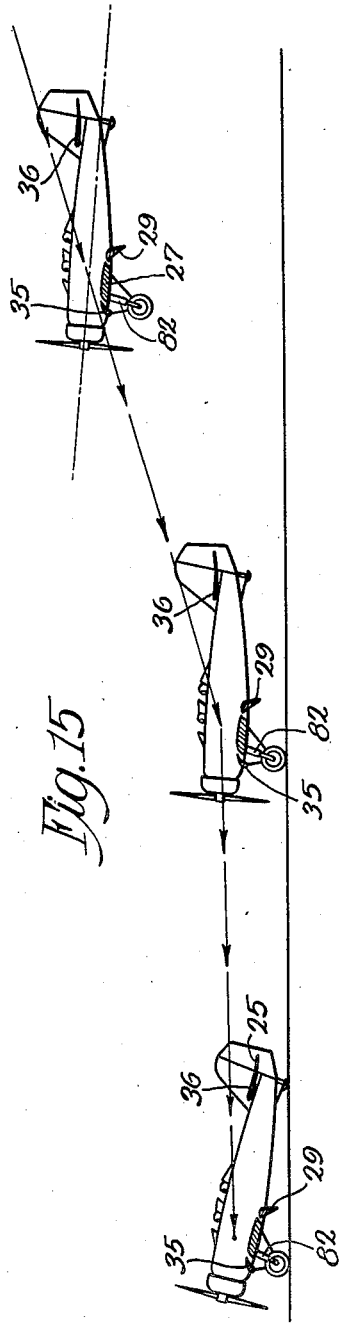
Inventor
James S. McDonnell Jr.
By Rector, Hibben, Davis & Macauley
His Attys.

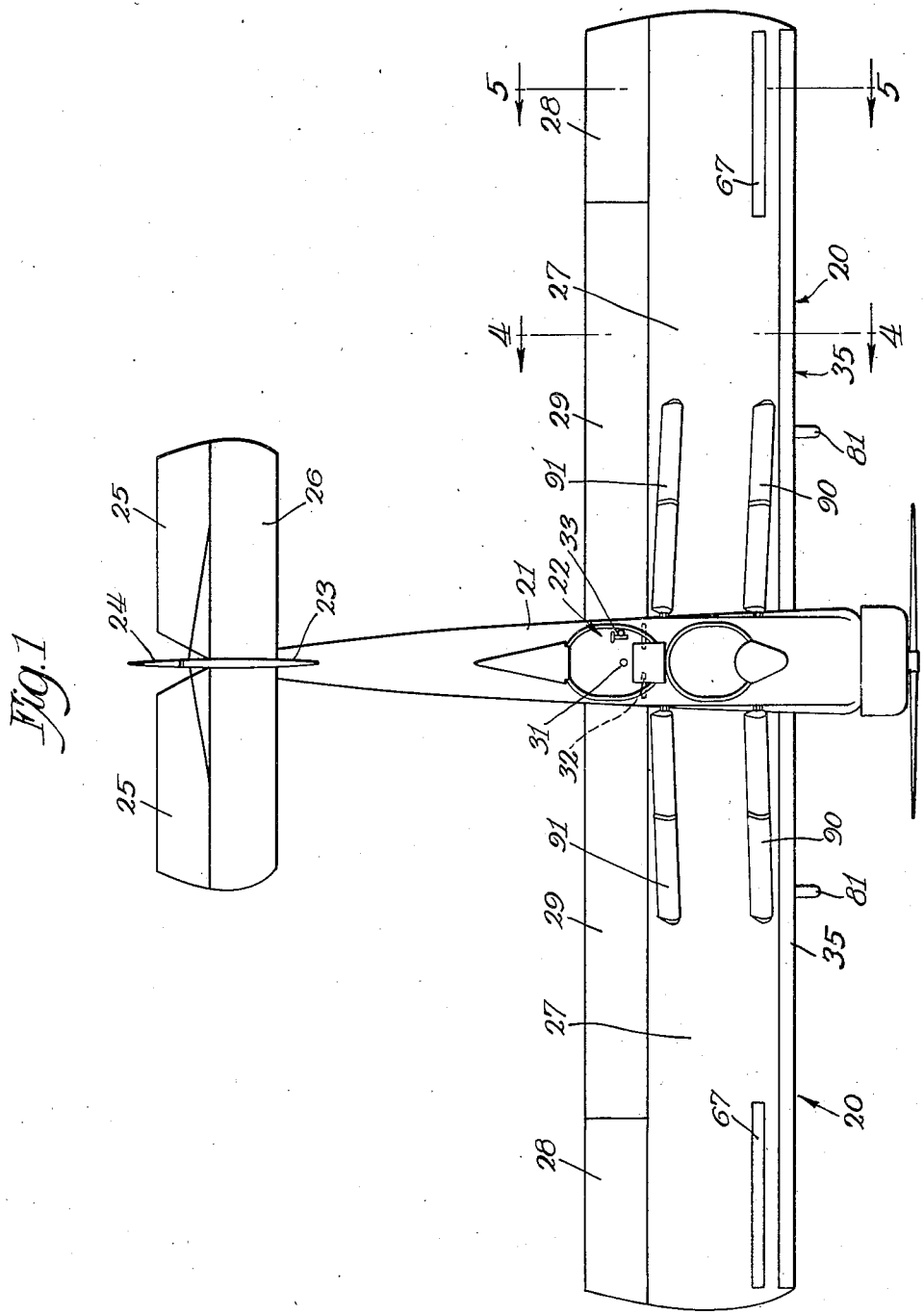

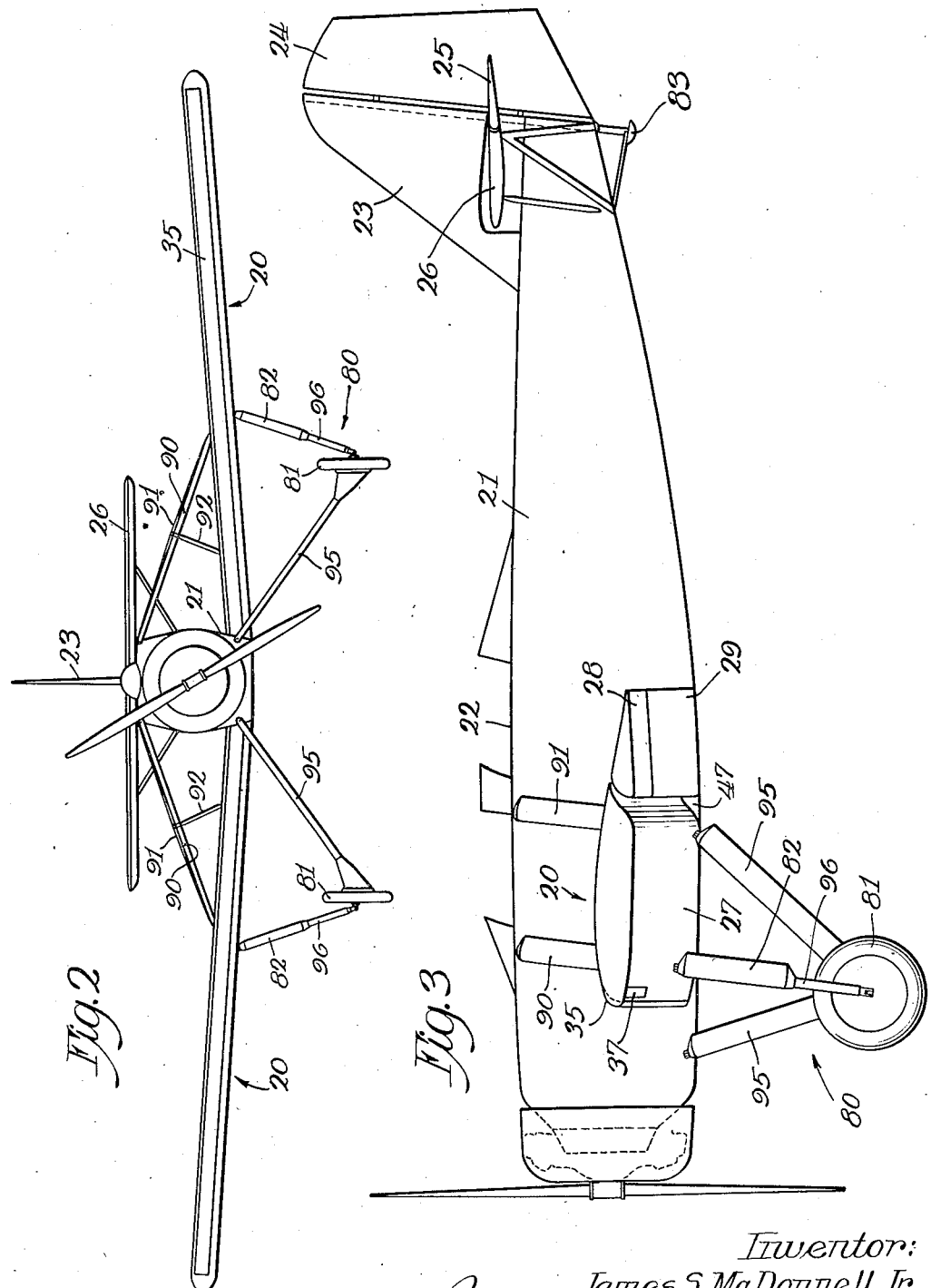

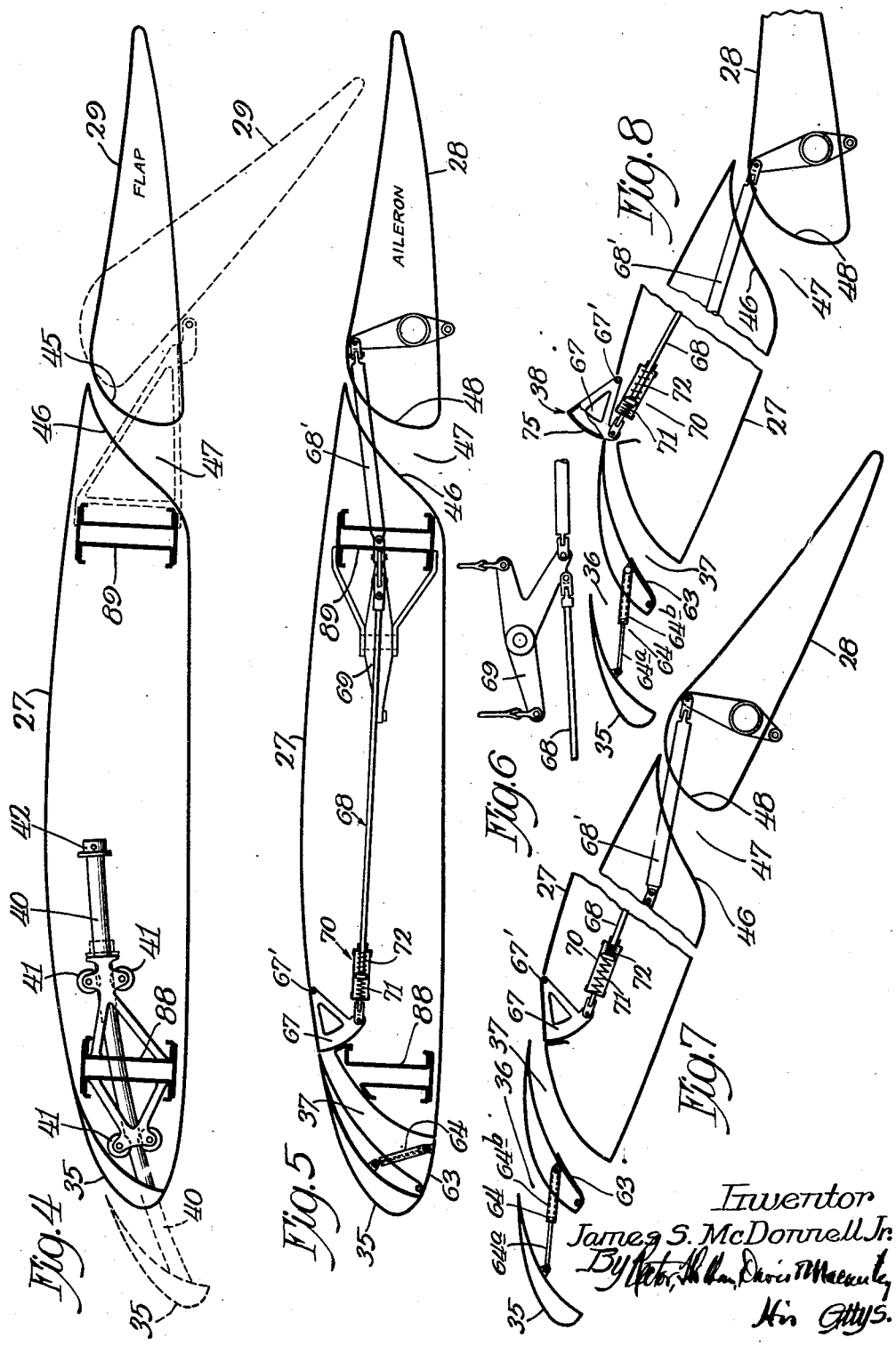

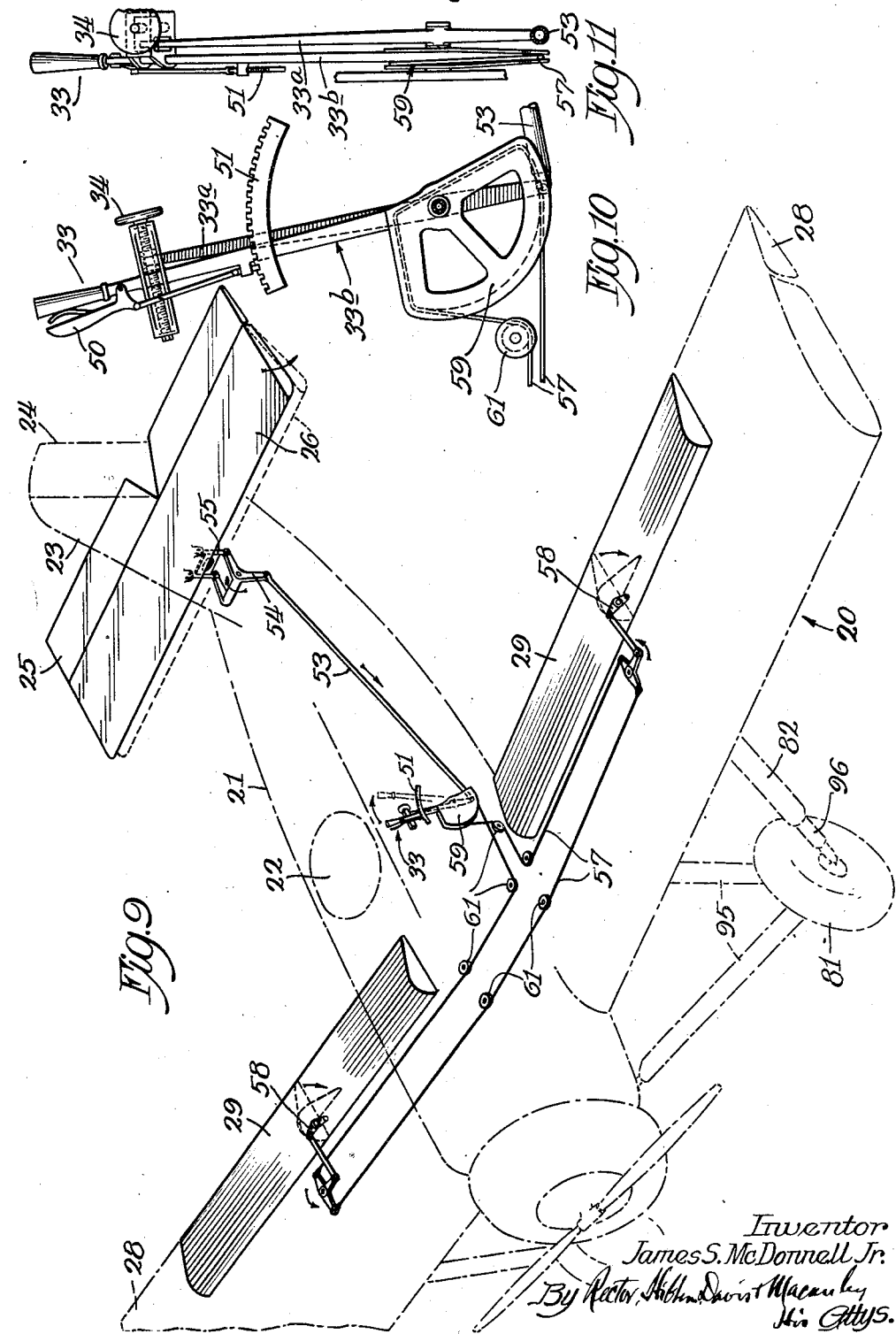

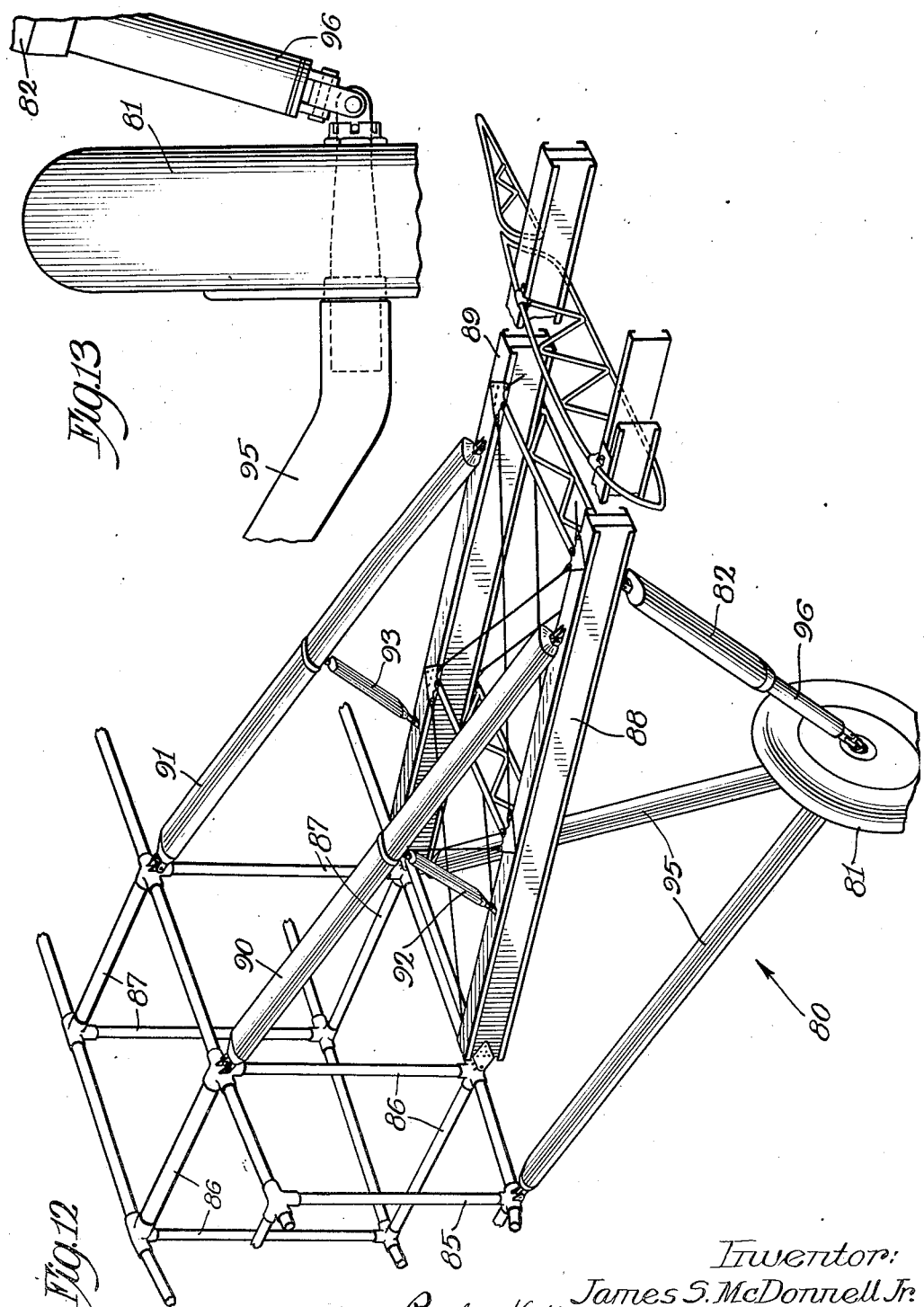

UNITED STATES PATENT OFFICE

JAMES S. McDONNELL, JR., OF CHICAGO, ILLINOIS

AIRPLANE

Application filed August 23, 1930. Serial No. 477,252.

The general object of my invention is to provide an airplane characterized by such safe stability and controllability under all expectable conditions; by such performance-characteristics in take-off, in landing, and in cruising flight; and by such ease and simplicity of proper operation by the pilot, that it is particularly suited for widespread private use; that is to say, for safe use by pilots of minimum expectable skill and experience.

To this end my invention resides in various features of airplane structure and combinations thereof hereinafter set forth and claimed, some of which features are quite widely applicable to different types of planes, but all of which are inter-related in the monoplane here shown for attainment of its performance objectives and for various structural advantages.

It is very desirable that an airplane for the stated use shall have such variable high-lift characteristics, under easy control of the pilot, and also shall have such a high angle of stall, that safe, normal take-off and climb may be made at slow speed, after only a short ground run, and with a very steep path of ascent. These characteristics, which are notably and novelly attained in the plane here shown, will permit of safe take-off from a small field hemmed in by trees or other obstacles of considerable height and, by virtue of the features that I provide, without material danger of disaster from gusty air.

Also, it is very desirable that such a plane shall be capable of level flight at very slow speed and that its glide-characteristics (with the engine idling or dead) shall accommodate its safe, slow descent in a very steep glide-path, yet in proper landing position, so that it may safely make direct impact landing, obviating any necessity for nice judgment in leveling-off just as the ground is being reached, and also minimizing the subsequent ground-run. These characteristics, which are markedly attained in the plane here shown, further its safe use in landing places that are small and obstacle-cramped, and likewise they greatly enhance the safety of slow flying at low altitudes and of making quickly-determined emergency landings, both of which expedients are apt to be vital on occasion, especially to meet conditions of poor visibility.

Further, it is important to maximum safety that the plane, characterized as above, shall not only have good normal lateral stability, as in cruising flight, but that quick, strong, lateral control shall be maintained at and even beyond stall-angle, so that, especially, gusty air conditions may be safely met in take-offs, landings, and other low-altitude flight conditions; and this highly effective control is novelly accomplished in the plane here shown.

Again, to insure safety in those flight-performances which utilize to the fullest extent the high-lift characteristics above stated, it is very desirable that the pilot shall be able to operate simultaneously and one-handedly the high-lift devices of the wings and the complemental stabilizer device of the empennage, so that constantly, and at every point throughout their respective ranges of movement, these complemental devices shall be in proper aerodynamic relation to each other to maintain longitudinal stability of the plane. Quickness of their operability under proper conditions is highly important.

I deem it very desirable, however, that while the last-mentioned devices shall be operable through their full movement-range with very little effort on the pilot's part, and with all celerity, when the plane is flying slowly, their resistance to full-throw, high-lift displacement shall be so great under high-speed flight conditions that improvident operation thereof under wrong conditions is adequately safeguarded against. These objects are attained, in the plane here shown, by novel coordination of the high-lift devices and the stabilizer device, insuring useful application of the aerodynamic forces acting on them; the arrangement which is here provided combining the two devices for properly-related operation from a single operating-member arranged for quick, convenient operation by the pilot, and said member receiving nearly-balanced reaction from the said devices, making it easy and quick to operate in lift-increasing direction when the forces acting on said complemental devices are of rather low order but making it strongly resistant to such operation, or practically impossible of operation, when said forces are of maximal order.

Further it is desirable in a plane that has landing and take-off characteristics as above stated, that its landing gear, and the association thereof with the frame of the plane, shall be featured by rugged ability to absorb the shock of the stated, slow impact landing without damage to the plane or discomfort to its passengers, and also that the landing gear shall offer strong resistance to lateral tipping in landing, take-off and "taxing", especially under adverse conditions of gusty air. These features I provide in the plane illustrated, and they find especially advantageous and novel embodiment in the low-wing monoplane shown.

A further object of my invention is to so relate and control the parts of the main lift airfoils or wings as to insure their most effective coordination and also to give strong, light and compact construction adequately safe-guarded against minor mishaps of landing fields and hangars.

Still other and further objects of my invention will become apparent from the following specification and the accompanying drawings, in which I have shown in considerable detail for purposes of full disclosure, one advantageous embodiment of my invention, the actual performances of which in several of the particulars above stated surpass, I believe, best airplane performance heretofore known.

In the drawings:

Figure 1 is a plan view of an airplane embodying my invention;

Fig. 2 is a front elevation thereof;

Fig. 3 is a side elevation thereof;

Fig. 4 is a cross-section through a wing, on line 4—4 of Fig. 1, of semi-diagrammatic nature omitting commonplace structural details; the leading-edge airfoil and the trailing-edge flap being shown in neutral position in full lines, and movements of these parts being indicated by dotted lines.

Fig. 5 is a similar section through a wing on line 5—5 of Fig. 1, showing air-slot parts and aileron in neutral positions.

Fig. 6 is a plan view of control connections for a "booster" slot closure shown in Fig. 5.

Fig. 7 is a diagrammatic sectional view similar to Fig. 5 showing the wing parts in down-aileron position at high angle of attack;

Fig. 8 is a similar view showing the parts in up-aileron position.

Fig. 9 is a diagrammatic perspective view illustrating the unified control of flaps and stabilizer.

Fig. 10 is a side elevation of control-lever mechanism therefor;

Fig. 11 is a front elevation of this mechanism.

Fig. 12 is a perspective view showing relationship between landing gear parts, wing frame and fuselage frame, omitting various structural details.

Fig. 13 is a detail of the landing-wheel mounting.

Fig. 14 is a "take-off" diagram, showing approximate positions of the plane in normal take-off.

Fig. 15 is a similar diagram indicating normal landing conditions.

In the monoplane here shown, numerals 20, 20 indicate the main lift airfoils or wings and 21 the fuselage having a pilot's cockpit 22; the empennage elements being the fixed fin 23, the vertically-pivoted rudder 24, the horizontally pivoted elevator 25, and the stabilizer 26, pivoted at its rear edge coaxially with the elevator's pivoted leading edge.

The wings 20 include rigid panels 27 diverging from the fuselage 21 on opposite sides thereof, substantially at its bottom; the wings preferably having a high dihedral angle, here shown as about 5°. Each panel carries on its rigid frame the movable elements of those provisions I make, by way of air-slots and trailing-edge flaps and trailing-edge ailerons, to secure the desired and novel aerodynamic qualities of these airfoils. Numerals 28 indicate the ailerons and 29 indicate the flaps, jointly extending substantially full wing-span; these members being preferably of like section for structural economy and simplicity, and being coaxially pivoted abaft their leading edges, for respective balance.

In the cockpit the customary "stick" 31 controls the elevator and the ailerons in usual fashion, the ailerons being preferably arranged for usual differential operation. Usual pedals 32 control the rudder 24. But novelly, in accordance with my invention, the stabilizer 26 and flaps 25 are subject to unified, harmonious control from a single operating member, here shown as hand-lever 33, concerning the operating-connections and arrangement of which more will be said presently.

The main lift airfoils have leading-edge air-slot provision for large increase of stall-angle. A leading-edge airfoil 35, preferably of full span extent, is slidably mounted at the leading edge of each rigid wing-panel 27 so as to open, when advanced, a leading edge air-slot 36, and to close it when retracted. "Booster" air-slot provision, generally indicated at 37, is additionally made, for lateral control, preferably in conjunction with a "burbler" 38, particulars of which "booster-burbler" construction will be described later.

The correlated features of very abrupt take-off, very steep glide-angle for landing, maintenance of quick, effective lateral control even at angles of attack above the stall, and capacity for very low-speed level flight, as well as other advantageous results that will presently appear, I attain jointly by my novel arrangement and combinations of said wing features, and I greatly enhance their useful availability by mechanically coordinating the stabilizer means 26 with the "high-lift" means, shown as flaps 29, for unified, nearly-balanced, and quick-acting control. These cooperative features are applicable to other types of planes than that here shown, but to take fullest advantage of the aerodynamic qualities thus provided, especially in making take-offs and landings, they are desirably supplemented by certain features of the landing gear and of general structure, which find very effective embodiment in the low-wing monoplane that I illustrate.

In normal, or "neutral" position of the several movable wing elements—that is to say, with the air-slots closed and with the flaps and ailerons in neutral position, as shown in full lines in Figs. 4 and 5,—the wings here illustrated are conventional in contour and area, being designed appropriately to the general rating of the plane as to gross weight, intended top speed, engine power, etc. These ratings may be widely varied, of course; but illustratively I will refer herein, for purposes of full disclosure of one satisfactory embodiment of my invention, to various facts and figures specific to a plane built substantially as shown in the drawings, wherein wing-span is 35 feet and chord is 5 feet 8 inches, the plane being of about 1800 pounds gross weight and designed for top speed of somewhat over 100 miles per hour when powered with a 110 H. P. engine.

Such "normal" section of the main lift airfoils will, of course, have a "normal" stall angle of ordinary range—this being, with the particular section here shown, about 15 degrees—but when the full-span, leading-edge air slot 36 is open it has effect to raise the stall angle of attack very greatly—in this instance to about 28 degrees.

The light-weight leading-edge airfoil 35 is carried by suitably-curved guide-tubes 40 freely slidable in anti-friction roller-guides 41 in the panel-frame, for opening movement until stopped by the collars 42 on the tubes. When retracted, this small airfoil 35 fits quite snugly against the leading edge of the rigid panel. The slot 36, when opened, is of suitable rearward slope, up-curve and taper for smooth air flow therethrough and for delivery of the air in tangential relation to the upper surface of the wing ahead of the wing's deepest section, with effects in increasing the stall-angle and decreasing the danger of nose-dive or spin from stall that, generically, are well-known in the art.

This slot-opening airfoil 35 is automatically operated and should be free at all times from any substantial resistance impeding its automatic responsiveness to lift-effect of the passing air. In this instance such airfoil is designed to move to open position at an angle of attack well below the stall angle of the "normal" airfoil section and at a relative wind-velocity of low order, well below minimum flying speed of the plane. Thirteen degree angle of attack, at 20 M. P. H. velocity, is ample to open the slot, in the particular plane shown.

The ground angle of the plane, at rest, I preferably make sufficiently great to insure that, when the plane has reached take-off speed in its ground-run, and its tail is depressed by pulling back the "stick", said leading-edge air slot will open, thus permitting prompt direction of the plane to a high angle of climb. This result may be had even with the flaps 29 in "neutral" position, but by far the quickest take-off and the steepest-angle climb are attained by also properly using the flaps, as will more fully appear.

For "high-lift" means, controllable by the pilot and available to increase the lift-coefficient at any angle of attack, I use the trailing-edge flaps 29 as most desirable construction, because of the mechanical simplicity and operating efficiency thereof. Structurally the flaps here shown are sufficiently large, and have sufficient range of angular displacement below their "neutral" or high-speed flight position, to double, or more than double, the lift-coefficient and to reduce the lift/drag ratio greatly as to the order of about 3 to 1, when given full-throw depression.

Preferably the flaps 29 have their leading-edge walls 45 so convexed and so related to the concaved trailing-edge wall 46 of the rigid wing-panel that, in known fashion, flap depression gradually opens an air-slot 47, of suitable slope, up-curve and taper, between these walls. Similarly the ailerons 28 have their leading-edge walls 48 shaped to open such a slot when depressed, and substantially to close the slot in "neutral" and in "up-aileron" positions.

The co-relation between the flaps 29 and the automatic leading-edge airfoil 35, which I here make, is such that flap-depression to a degree approaching full-throw depression aero-dynamically compels the automatic opening of the leading-edge air slots even in slowest flight, with attendant safety in flying with the flaps depressed to their full extent.

Thus it is automatically assured, under substantially all conditions of minimum-speed level flight, of steep-angle take-off, and of steep-angle descent, that the leading-edge air-slots are open. Yet, by virtue of the mechanical independence of the leading-edge airfoil 35 from the flaps, placement of the flaps in any position, whether raised or lowered, does not militate against automatic effectiveness of the air slots, under appropriate attack-angle and velocity conditions.

In the airplane here shown full lowering of the flaps (accompanied by appropriate adjustment of the stabilizer and/or the elevator to maintain level flight) enables a level flight-path to be held at very low speeds, at or below 34 miles per hour. Likewise, under such conditions of high lift-coefficient, but with greatly decreased lift/drag ratio, low velocity glide with the engine idling or dead, is safely maintained at an angle of descent steeper, I believe, than heretofore ever attainable with safety; the normal glide path in landing being 17° or steeper in the particular plane here shown, and with a vertical velocity of about 15 feet per second. The characteristic position of the plane under such descent-conditions is substantially indicated, diagrammatically, in Fig. 15.

In take off the flaps should be depressed substantially full-throw and, with flaps down and air-slot 36 open, the plane climbs in a flight path approximately twice as steep as that of an ordinary airplane of equivalent wing- and power-loadings; climbing position of the plane being substantially as diagrammed in Fig. 14.

With the factors of safe performance made available by the stated provision of high-lift flap devices and independent automatic leading edge airslot means, I provide complemental control devices that make safe and simple the useful employment of these factors to the extremes of their effectiveness. Particularly I provide means to compel the joint and proportional operation of the stabilizer 26 and the flaps 29 in such manner as to maintain longitudinal stability of the plane in any position of their joint adjustment; making this provision in such fashion that the flaps and stabilizer are quick and easy to operate jointly, under appropriate conditions, notwithstanding that the air forces acting on them make either thereof, if handled singly, relatively slow and difficult to control.

As the flaps 29 are lowered, the center of pressure on the wings moves rearwardly. The resultant tendency to nose the plane down is best met by proportional depression of the leading-edge of stabilizer 26. In the particular plane shown, about 11 degrees of stabilizer movement will compensate for full throw movement of the flaps, in maintaining longitudinal stability. I provide for simultaneous and proportional operation of the flaps and stabilizer throughout their respective ranges of movement.

Hand lever 33 for flap and stabilizer control, conveniently located for manipulation by the pilot, may be held in any position of adjustment by hand latch 50 coacting with a fixed segment 51. In the specific form shown, a push-pull rod 53 connects the lever mechanism with stabilizer 26 through an intervening bell crank lever 54 and upright link 55. Pull cables 57 connect the rocking-levers 58 on the flaps with the drum-member 59 of the hand lever mechanism 33, the cables running over appropriate pulleys 61.

Preferably, adjustment is provided in the connection of the hand lever 33 with either the flaps or the stabilizer, for varying their relative angular positions. Thus the hand lever structure 33 here shown is of two-piece construction, with the portions 33a and 33b coaxially pivoted and adjustably connected together by a hand-screw 34, the one part 33a of the lever having the push-pull rod 53 connected to it and the other part 33b of the lever carrying the drum member 59.

With the parts connected as shown the flaps' reaction on hand lever 33, when depressed, is opposed by the stabilizer's reaction on such hand-lever. Thus the air forces acting on each are usefully employed to facilitate the operation of the other. If desired the leverages may be proportioned for nearly perfect balancing of these forces against each other. Intentionally, however, I so proportion the leverages that the flaps having a somewhat preponderating reaction on the operating lever 33. When the forces acting on the flaps and the stabilizer are small, due to low relative wind velocity or to rather small angular displacement of the stated parts, this intentional preponderance of flap-reaction on the lever is not of great effect. Under such conditions very little effort on the part of the pilot is necessary to throw the flaps down. However, under high-speed flight conditions the air-forces resisting depression the flaps are so great that the stated preponderance has great effect. Sudden flap-depression to a dangerous extent, under such conditions, is practically impossible.

In reverse operation, of restoring the flaps to neutral, the air forces acting on the flaps and tending to so restore them are more than sufficient to force the stabilizer back to neutral. The promptness and "fool-proofness" of full control over these flap and stabilizer devices is a very important safety-factor in the performance of the plane here shown. It aids greatly in making proper handling of the plane to be of the simplest.

For take-off the flaps need not be preliminarily depressed. After a "tail-up" ground run sufficient to gain lowest flying-speed, the flap-stabilizer-control lever 33 may be appropriately pulled back with one hand and automatically latched there, just prior to pulling back the stick with the other hand; so that with greatest celerity the plane may be brought to its proper angle of thrust and be given the proper degree of flap depression for maximum angle of climb. Correspondingly, normal landing-technique requires only that the airplane be brought to slow flight at any desired altitude and that the flaps be thrown directly to fully depressed position by simply pulling back the flap-stabilizer-control lever 33, the plane being held approximately level or slightly nose-up, as indicated in the diagram, Fig. 15. This position of the plane may be maintained until it lands, avoiding the usual necessity for skilfully leveling-off.

It will be apparent that construction of the wings 20 as above described, is simple, rugged and not liable to injury in the provisions concerning the leading-edge air-slot, the flaps, or the ailerons. Freeing the leading edge airfoils 35 for wholly automatic operation by aerodynamic forces, enables their structure to be at once simple, light and amply strong. Location of the ailerons in the usual trailing-edge position adjacent the wing tips affords them the usual protection by the rigid wing panels 27 against injury from landing field "ground-loops" or other minor mishaps.

It will further be apparent, however, that with the ailerons thus located, and with the plane designed for normal performance at such high angles of attack as above described, it is very desirable to provide special lateral-control devices, supplementing the structures heretofore described, that give quick and strong lateral control even at angles of attack above the stall.

In the construction here shown for the stated purpose I provide the "booster" air-slot 37 in the tip-portion of each wing, abaft the leading-edge air-slot 36, such booster-slot being of substantially the same span as the aileron 28. As shown, this booster slot 37 has its boundary walls rigidly built through the panel structure 27 and shaped to give the slot desired rearward slope, up-curve and taper. While the exact location of such slot in the forward portion of the panel may be varied, I find that high effectiveness is attained by having its bottom or intake orifice about as close to the leading edge of the fixed panel member 27 as is structurally feasible and its top or outlet orifice located ahead of the thickest section of the wing.

It will be appreciated that with the leading-edge air-slot 36 open the curve representing the lift-coefficient of the wing does not break down, as the angle of attack passes beyond stall angle, with that abruptness which characterizes the "knee" of such a curve when an unslotted airfoil of otherwise similar section passes its lower-degree stall-angle. Supplementarily, the booster-slot above described, when opened, has effect to increase somewhat the already high stall-angle of the affected wing as a whole, but at angles of attack somewhat above the high stall-angle thus jointly influenced by the full-span leading-edge air-slot and the short-span booster-slot, such booster-slot has profound effect to maintain the lift locally to the tip-portion of the wing.

For best utilizing the joint benefits of the leading-edge air-slot 36 and the booster-slot 37 I provide closure means for the booster-slot arranged for automatic operation to open the slot on appropriate occasion only. Specifically, I so arrange these devices that the booster-slot of each wing shall be closed except under the two-fold conditions that the angle of attack of the wing be high enough to open the leading-edge slot and that the aileron of that wing be depressed.

Specifically, 63 is an inlet closure or door for the booster slot 37, pivoted at its front edge and automatically controlled from the leading-edge airfoil 35, for opening and closing movements in keeping with the automatic movements of said airfoil. Closure 63 is connected with the small airfoil 35 by a lost-motion link 64, the telescopic sections 64$^a$ and 64$^b$ whereof are pivoted respectively to parts 35 and 63, an opening in the wall of the panel 27 accommodating the bodily swinging of the link. The lost motion between the respectively headed and socketed link parts is such that when airfoil 35 moves forward the first part of its travel merely swings the link downwardly and takes up the lost motion. The last portion of the travel of airfoil 35 positively opens the inlet closure 63, the resistance of which to such movement is not great enough to materially impede the movement of the airfoil 35. 67 is an outlet closure for the booster slot, pivoted as at 67' and controlled in its opening and closing movements from the respective aileron 28 so as to be opened only under down-aileron condition. Specifically, a link-member 68, universally jointed at both ends, connects this closure 67 with the aileron-operating parts; specifically, in this instance, with the bell-crank lever 69 which is part of the customary connection between the stick and the differentially-operable aileron. A head-and-socket lost-motion device 70 in this link 68 permits aileron movement, either up or down, through a suitable portion of its angular range without moving the closure 67 from its normal, slot-closing position.

Preferably, the lost-motion device 70 has suitable springs 71 and 72 between the socket-ends and the opposite sides of the head to normally position the head in mid-position. Thus under high-speed flight conditions ordinary aileron movement does not affect the closure 67. When the aileron is moved full down, however, the spring is fully compressed and the closure 67 is moved to slot-opening position.

It will now be apparent that, with the plane at such a high angle of attack as to open the leading-edge air-slot 36 and consequently the inlet closure 63 of the booster slot, sufficient aileron depression will open the outlet closure 67 for said booster slot, thus greatly increasing lift-coefficient of such wing adjacent its tip, while, with respect to the other wing, up-aileron condition maintains its respective booster slot closed by outlet-closure 67.

It is further desirable that, under conditions last described, the lift-coefficient of the up-aileron wing shall be positively decreased, to augment the rolling moment of the plane. To this end I provide in connection with the booster-slot a "burbler" arrangement 38, preferably embodied in the same structure as the slot closure 67. In the specific construction shown the combined closure and burbler is a cylinder sector, the arcuate wall 75 whereof moves, in down-aileron position (Fig. 7) to open the slot-orifice, and in neutral position (Fig. 5) closes said orifice. In up-aileron position (Fig. 8) the link tube compresses its forward spring and moves the wall 75 to position that not only maintains the slot closed but that projects above the upper surface of the wing (as "burbler" 38) to break the air flow over the wing tip portion, greatly decreasing the lift-coefficient of the wing-tip and increasing its drag-coefficient.

It will be appreciated that such "booster burbler" provision as above described enables the plane to be maneuvered with safety in its normal steep-angle take-offs and landing-glides, even under gusty air conditions that tend to tip the plane laterally. Also it gives substantial safety, in emergency, to performances exceeding the normal performance range heretofore stated in steepness of descent and, to some extent, of climb-angle. In spot-landing, for example, in a very restricted space, the down-gliding plane may be temporarily nosed up, so that temporarily the descent is much steeper and at greater vertical velocity than normal but still the plane may be held in proper lateral position by the effect of the ailerons and the booster-burbler construction and the normal glide conditions may be resumed at will to make the landing on the desired spot.

For embodiment of the aerodynamic features and the control features above described, usual selection may be had between the several types of plane, common in use,—that is to say high-wing or low-wing monoplanes or biplanes. But the low-wing type of monoplane, as here shown, affords various structural advantages, particularly with respect to the provision of landing gear peculiarly adequate for the stated purposes of my "safety" plane.

The landing gear 80 here shown is of notably wide tread between its ground wheels 81, being preferably about one-third of the wing span; is equipped with long-travel shock absorbers 82, preferably of the oleo type; and is associated with the framework of the fuselage and with the wings in an arangement especially appropriate for its landing-performances. The tail-skid 83 may be of any approved type, preferably including an oleo shock-absorber; and the ground wheels 70 are preferably brake-equipped.

Referring particularly to Fig. 12, the fuselage frame has several tubular bulkheads 85, 86 and 87, each of which is a closed rectangle. Wing beams 88 and 89 are connected to the lower corners of bulkheads 86 and 87 and each wing beam is braced to the upper corner of its bulkhead 86 or 87 by a main strut 90 or 91, supplementary mid-span struts 92 and 93 connecting the mid-portion of each respective main strut to its wing-beam 88 or 89 at a point between the main strut and the fuselage. Preferably, in the construction shown, the forward wing-strut 90 is straight, between its ends points of attachment; rear strut 91 is slightly up-curved or cambered, for reasons to be stated.

Each ground wheel 81 has its axle 81' carried by a V-frame 95, having its legs pivoted respectively to fuselage bulkheads 85 and 87 and extending downwardly and outwardly as shown. The outer end of the wheel-axle has pivotally connected to it the upwardly and outwardly extending leg 96, the upper end of which is pivoted to the forward wing beam 88 at substantially its intercept with the axis of strut 90. The lower end of the leg 96 is detachable from the wheel axle to permit wheel removal, but normally the loss of a landing wheel is made impossible through its confinement between the V-frame and the leg 96 element.

The shock absorber 82, incorporated in leg 96, is endwise compressible, any suitable make being used that is adapted for sufficient length of travel and for adequate pressure-carrying capacity to handle the weight of the plane at its vertical landing-velocity. The high dihedral angle of the plane-wings facilitates use of such a long-travel shock-absorber, in arrangement as shown.

The specific relation of the landing gear to the wing and fuselage-frames here shown is especially rugged, particularly in its distribution of stresses in laterally tilted landings. In landing the thrust communicated through the shock absorber 82 puts the forward wing beam 88 under tension and its connected strut 90 under compression, wherefore said strut is made straight; the connecting strut 92 between these parts resisting deflection of the straight main strut 90 in either direction. The rear wing-beam 89, being but little affected by landnig conditions, has its strut 91 upwardly cambered, and the connection 93 between these parts effectively conditions them to jointly resist deflections under flight-loads.

It will be apparent to those skilled in the art that while I have described a preferred embodiment of my invention with considerable particularity, many changes in the construction and arrangement of parts may be made without departure from the spirit of my invention, within the scope of the appended claims.

I claim:

1. In an airplane, the combination of main lift airfoils having adjustable high-lift means, complemental airfoil means adjustable to compensate for shifting of the center of pressure on said airfoils under changes of adjustment of said high-lift means, connections between said high-lift means and said complemental air foil means for simultaneous operation thereof to maintain substantial longitudinal stability of said plane in any position of adjustment of said high-lift means and arranged to be reacted on oppositely, with balancing tendency, by said high lift means and complemental airfoil means under the aerodynamic forces that tend to move them and means to operate said connected parts.

2. Structure as set forth in claim 1, wherein said connections between the high-lift means and complemental airfoil means give preponderating effect to the reaction of said high-lift means.

3. Structure as set forth in claim 1, wherein the aerodynamic forces acting on said high-lift means tend to move said inter-connected parts to neutral position and wherein said operating means comprises a manually-operable lever-device and said connections give preponderating effect to the reaction of said high-lift means on said lever device, for resisting lift-increasing operation of said high-lift devices under high-speed flight conditions.

4. In an airplane, the combination of main lift airfoils having adjustable high-lift means, stabilizer means adjustable to compensate for the shifting of the center of pressure on said airfoils under changes of adjustment of said high-lift means, connections between said high-lift means and said stabilizer-means for simultaneous operation thereof to maintain substantial longitudinal stability of said plane in any position of adjustment of said high-lift means, a hand-lever operatively associated with said connections for control of the proportional adjustment of said high-lift means and said stabilizer-means, and means for adjusting the setting of one thereof (high-lift means or stabilizer-means) with respect to said hand-lever.

5. In an airplane, the combination of main lift airfoils having trailing-edge flaps adjustable through large angular range that greatly varies at maximum adjustment the lift/drag ratio of said airfoils, stabilizer-means in the plane's empennage angularly adjustable to compensate for the shifting of center of pressure on said airfoils under changes of angular adjustment of said flaps, mechanical connections between said flaps and said stabilizer-means for simultaneous operation thereof to maintain at all points in the adjustment-range of said flaps substantial compensating angular adjustment of said stabilizer-means to maintain substantial longitudinal stability of said plane, and a hand-lever under pilot's control for actuating said connections, said flaps and stabilizer being arranged for opposite reaction on said hand-lever with substantial balancing effect on each other under the aerodynamic forces acting thereon.

6. In an airplane, the combination of main lift airfoils having adjustable high-lift means, horizontally arranged complemental airfoil means longitudinally separated from said main lift airfoils and adjustable to compensate for shifting of the center of pressure on said main lift airfoils under changes of adjustment of said high-lift means, connections between said high-lift means and said complemental airfoil means for simultaneous operation thereof to maintain substantial longitudinal stability of the plane in any position of adjustment of said high-lift means and arranged to be reacted upon oppositely, with balancing tendency, by said high-lift means and complemental airfoil means under the aerodynamic forces that tend to move them, and a single manually-operable means for operating said connected parts.

7. In an airplane, the combination of main lift airfoils having adjustable high-lift means, stabilizer means adjustable to compensate for the shifting of the center of pressure on said airfoils under changes of adjustment of said high-lift means, connections between said high-lift means and said stabilizer-means for simultaneous operation thereof to maintain substantial longitudinal stability of said plane in any position of adjustment of said high-lift means and arranged to be reacted on oppositely by them, with substantial balancing effect under the aerodynamic forces that tend to move them, manually-movable means to operate said connected parts and means for retaining said manually-movable means in different positions of adjustment.

8. In an airplane, the combination of main lift airfoils having adjustable high-lift means, horizontally arranged complemental airfoil means longitudinally separated from said main lift airfoils and adjustable to compensate for shifting of the center of pressure on said main lift airfoils under changes of adjustment of said high-lift means, connections between said high-lift means and said complemental airfoil means for simultaneous operation thereof to maintain substantial longitudinal stability of the plane in any position of adjustment of said high-lift means and arranged to be reacted upon oppositely, with balancing tendency, by said high-lift means and complemental airfoil means under the aerodynamic forces that tend to move them, means convenient for pilot's operation for adjusting the settings of said high-lift means and said complemental airfoil means with respect to each other, and manually-operable means to operate said connected parts.

9. In an airplane, the combination of main lift airfoils having trailing-edge flaps which are adjustable through large angular range and which at maximum adjustment greatly vary the effective camber of said airfoils and the virtual angle of attack thereof; stabilizer means angularly adjustable to compensate for the shifting of the center of pressure of said airfoils under changes of flap-adjustment; connections between said flap and said stabilizer means for insuring simultaneous, harmonious adjustment of the flaps and stabilizer; said main lift airfoils having leading edge airfoils automatically operable to open leading-edge air-slots under ordinary flight conditions with the flaps depressed; said main lift airfoils having booster air-slots abaft said leading-edge air-slots and near the wing-tips; closure-means for said booster air-slots; trailing-edge ailerons abaft said respective booster slots; and controlling means for said closure-means operatively associated with said leading-edge airfoils and said ailerons for moving said booster-slot closure-means to booster-slot-opening position only when the respective aileron is depressed and the respective leading-edge air-slot is open.

10. In an airplane, the combination of main lift airfoils having trailing-edge flaps, stabilizer means, manually operable means for simultaneously adjusting in compensating relation said flaps and stabilizer; said main lift airfoils also having trailing edge ailerons, leading-edge air-slots, and booster air-slots between the ailerons and leading-edge air-slots, and closure-means for said booster-slots automatically operable by said ailerons.

11. In an airplane, the combination of main lift airfoils having trailing-edge flaps, stabilizer means, manually operable means for simultaneously adjusting in compensating relation said flaps and stabilizer; said main-lift airfoils also having trailing-edge allerons, leading-edge air-slots, and booster air-slots between the ailerons and leading-edge air-slots, closure-burbler means associated with said booster slots, automatically operable by said ailerons to slot opening position when the respective aileron is down, to slot closing position when said aileron is neutral, and to raised position above the surface of said main lift airfoil when the aileron is up.

12. In an airplane, wings having manually-adjustable trailing-edge flaps, wide-span automatically-operable leading-edge airfoils for opening and closing leading-edge air-slots, said leading-edge airfoils being automatically movable to slot-opening position under ordinary flight conditions with the flaps depressed, and trailing-edge ailerons, said wings having narrower-span booster air-slots adjacent their tips and means for closing the booster-slot of each respective wing operatively associated with the leading-edge airfoil and the aileron for such wing for automatic booster-slot-opening action only when the leading-edge air-slot is open and the corresponding aileron is depressed.

13. In an airplane, the combination with the panels of main lift airfoils, of leading-edge airfoils operable to open and close wide-span leading-edge air-slots, trailing-edge ailerons adjacent the tips of said main lift airfoils, and booster air-slots through said panels, of less span than said leading-edge air-slots, arranged between said respective ailerons and the corresponding leading-edge airfoils.

14. In an airplane, the combination with the panels of the main lift airfoils, of wide-span leading-edge airfoils automatically operable to open and close leading-edge air-slots, trailing-edge ailerons of less span than said leading-edge airfoils, booster-slots of substantially aileron-span arranged between said respective ailerons and the leading-edge airfoils, and closure-means for said booster slots operatively associated with said leading edge airfoils and with said ailerons to open only when the respective leading-edge air-slot is open and the corresponding aileron depressed.

15. Structure as set forth in claim 14 wherein said closure means for the booster-slots have operative connection with the respective ailerons for opening movement only after predetermined range of aileron depression.

16. Structure set forth in claim 14 wherein the closure means for each booster-slot comprises one closure operatively connected with the respective leading-edge airfoil and another closure operatively connected with the respective trailing-edge ailerons.

17. In an airplane, the combination with the panels of main lift airfoils, of leading-edge airfoils automatically operable to open and close leading-edge air-slots, trailing-edge ailerons, and booster-burbler means comprising booster slots of less span than said leading-edge airfoils, arranged between said respective ailerons and the leading-edge air-slots, and means operatively associated with each aileron for opening such booster-slot in down-aileron position and for closing such booster-slot and projecting a burbler above the panel-surface in up-aileron position.

18. In an airplane, the combination with the panels of main lift airfoils, and trailing-edge ailerons therefor, of booster-burbler means comprising booster-slots extending through the wing panel and having associated with each thereof means to open and close said slot and to project above the upper surface of the panel, said means being operatively connected with the respective ailerons for movement to slot-opening, slot-closing and projected positions respectively, accordingly as said aileron is down, neutral, or raised.

19. Structure set forth in claim 18 wherein lost motion connection is provided between each said aileron and the respective closure-means, whereby each aileron has a suitable range of movement without effectively moving the closure-means.

20. In an airplane, the combination with the fuselage, of wings having leading-edge air-slots and trailing-edge depressible flaps cooperative to facilitate steep-angle-glide descent for impact landing, and landing-gear comprising ground wheels connected with opposite sides of the fuselage and the respective wings in wide-tread spaced relation approximating one-third of the wing-span, said wheel-connections including carrier-members pivotally connected at their inner ends of the fuselage frame and shock-absorber members connected with the wings remote from the fuselage, said shock-absorber elements having long-travel compressibility.

21. Structure set forth in claim 20 wherein the wings extend from the lower corners of the fuselage bulkheads in low-wing monoplane construction, and main struts connecting the upper corners of the fuselage bulkheads with the points of the wing structures to which the shock absorbers are connected.

22. In a low-wing monoplane of the character described, the combination with a fuselage frame having rectangular bulkheads, wings having beams connected with the lower corners of appropriate bulkheads, landing gear frame-members connected with the lower corners of appropriate bulkheads and extending downwardly and outwardly therefrom, landing wheels supported by said frame-members in wide-tread spacing approximating one-third of the wing-span, shock-absorbing legs connecting the wheel-supports with the respective wings remote from said fuselage, struts extending from the upper corners of fuselage bulkheads to points on the wings adjacent the points of connection thereto of said shock-absorber legs, and other struts connecting the mid-portions of said first-mentioned struts with the wing-beams between the fuselage and the connection of the shock absorber legs.

23. In a low-wing monoplane of the character described, the combination with a fuselage having rectangular bulkheads, wings having front and rear beams connected with two respective bulkheads, front and rear main struts connecting said wing beams with said bulkheads, said front struts being substantially straight and said rear struts being upwardly cambered, bracing struts connecting mid-portions of the main struts with the respective beams therebelow, and landing gear comprising wheels, carriers therefor, and a shock absorber leg, said leg being connected with the front wing-beam adjacent its point of connection with said main strut.

In testimony whereof I have subscribed my name.

JAMES S. McDONNELL, Jr.